(No Model.)

C. RAAB.
ELECTRIC METER.

No. 599,046. Patented Feb. 15, 1898.

WITNESSES:
Eugenie A. Brider.
G. W. A. Eisenbraun.

INVENTOR
Carl Raab,
BY
A. Kaherdukauf,
ATTORNEY

UNITED STATES PATENT OFFICE.

CARL RAAB, OF KAISERSLAUTERN, GERMANY.

ELECTRIC METER.

SPECIFICATION forming part of Letters Patent No. 599,046, dated February 15, 1898.

Application filed February 27, 1896. Serial No. 581,009. (No model.) Patented in England January 13, 1896, No. 868, and in Germany May 30, 1896, No. 87,042.

*To all whom it may concern:*

Be it known that I, CARL RAAB, a subject of the King of Bavaria, residing at Kaiserslautern, in the Kingdom of Bavaria, in the German Empire, have made a new and useful Invention in Electric Meters, (for which I have obtained Letters Patent in Great Britain, No. 868, dated January 13, 1896, and in Germany, No. 87,042, dated May 30, 1896,) of which the following is a specification.

My invention relates particularly to a meter designed for measuring alternating currents, and has for its object to provide simple and accurate means for registering or recording the quantity, intensity, or volume thereof. In order to enable others skilled in the art to construct and use the same, reference is had to the accompanying drawings, in which—

Figure 1:
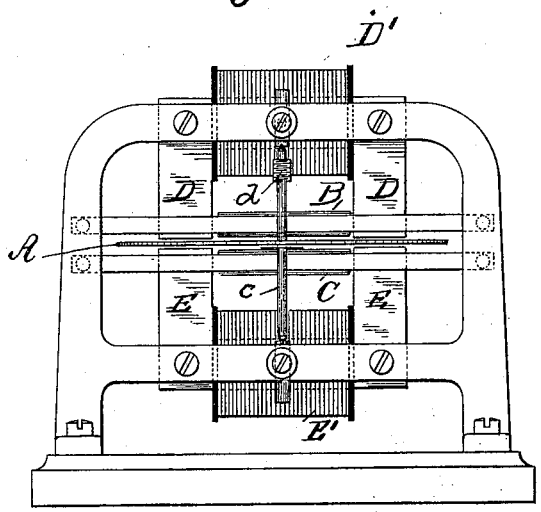
Figure 2:
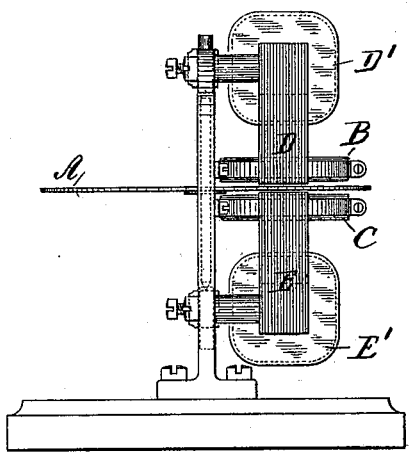
Figure 3:
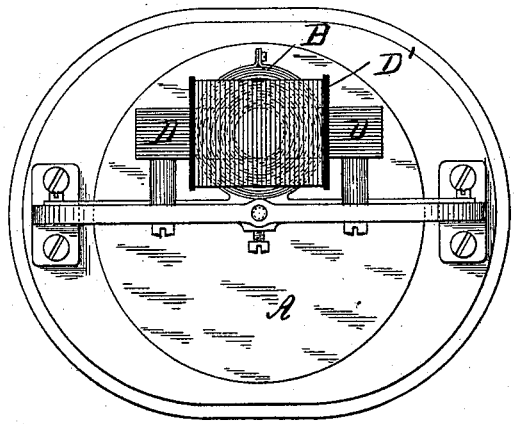

Figure 1 is a front elevational view of a meter constructed in accordance with my invention. Fig. 2 is a side elevational view as seen looking at Fig. 1 from left to right, and Fig. 3 is a plan or top view as seen looking at Fig. 1 from the top toward the bottom of the drawing.

Like letters of reference represent like parts wherever they occur throughout the specification and upon the drawings.

Referring now to the drawings in detail, A designates a metallic armature-disk rotatably mounted by means of a shaft $c$, said shaft having suitable bearings in the frame at its opposite ends and provided with a worm $d$ or other means from which motion is conveyed to a counter, register, or recording device. (Not shown, but of any suitable or well-known construction.) This armature-disk is arranged between the poles of two coreless solenoids B and C, placed in the circuit to be measured, and also between the ends of the cores D D and E E of two electromagnets having coils D' and E' of a relatively large number of windings, said coils being placed in shunt relation to the source of current-supply. The cores D D E E form a closed iron magnetic circuit, and the magnetic flux, starting therefrom, crosses the armature-disk at two different points. The main-current field produced by the solenoids B and C is absolutely free from iron and is preferably situated immediately between the poles D D E E of the electromagnets D' E'. It will be readily understood that in view of this arrangement magnetic turning moments acting from the same direction are produced at two points where the magnetic lines of the shunt-current cross the armature-disk.

I find that a meter built in accordance with the above description possesses great superiority over meters of former construction. Such an arrangement also gives exceedingly efficient results without affording the necessity of increasing any waste of energy in the shunt and the resistance of the main-current conductor. Such a meter is also compact in form by reason of the symmetrical arrangement of its parts with regard to the axis, as shown in Fig. 1 of the drawings. It is not essential that the poles of the coreless solenoids B and C shall be arranged between the ends of the cores D D and E E of the electromagnets D' and E'; but they may be laterally displaced with reference thereto and still come within the scope of my invention.

Should it be required to double the power of the motor, the propelling parts thereof might be duplicated by locating additional coils and magnets upon the opposite side of the axis, as will be clearly apparent on inspection of Fig. 3, the circuit connections being obvious to those skilled in the art. It is also obvious that the meter might be constructed in such manner that the armature-disk A would be crossed at one place only by the lines of force of the electromagnets. For instance, two legs opposite to each other of a horseshoe, half could be placed outside of the disk extending across the same and united to form one piece of material. It is furthermore obvious that the shunt-coils instead of being placed upon the yokes might be arranged on the legs of the horseshoe-magnets and instead of the two main solenoids a single solenoid could be provided without altering in any way the action of the apparatus hereinbefore described.

Having thus described my invention, what I claim, and desire to secure by Letters Patent of the United States, is—

1. An electric meter having a disk-armature and two coreless solenoids placed on opposite sides of said disk and in inductive proximity thereto, in combination with two electromagnets located also on opposite sides of the disk and having pole-pieces extending into close proximity thereto, the solenoids being located in the circuit to be measured and the electromagnets in a shunt-circuit thereto, substantially as described.

2. An electric meter having a disk-armature sustained by a shaft and two coreless solenoids located on opposite sides of said disk and in close proximity thereto, in combination with two electromagnets located also on opposite sides of the disk and having the poles thereof in close proximity to each other and forming a closed magnetic circuit, said solenoids being located in the circuit to be measured and the electromagnets being wound with a relatively high number of turns and included in a shunt-circuit, the arrangement being such that the inductive fields established by the solenoids and magnets are to one side of the shaft which sustains the armature, substantially as shown and described.

3. An electric meter having a disk-armature A sustained by a shaft $c$, in combination with two coreless solenoids B and C located on opposite sides of the disk and to one side of the shaft $c$, and with their poles in close proximity to each other, together with two electromagnets having horseshoe-cores D D, E E located on opposite sides of the disk and in close proximity to each other, the coils D' E' of which are of a relatively high number of turns and included in a shunt-circuit, the coreless solenoids B and C being included in the circuit to be measured and located between the poles D D, E E of the electromagnets, substantially as described.

In testimony whereof I have signed my name to this specification in the presence of two subscribing witnesses.

CARL RAAB.

Witnesses:
   FRIEDRICH CORRELL,
   MICHAEL ZIMMERMANN.